Sept. 26, 1972   A. V. APPEL ET AL   3,694,285
METHOD FOR MAKING ENCODED CARDS
Filed Sept. 29, 1970   3 Sheets-Sheet 1
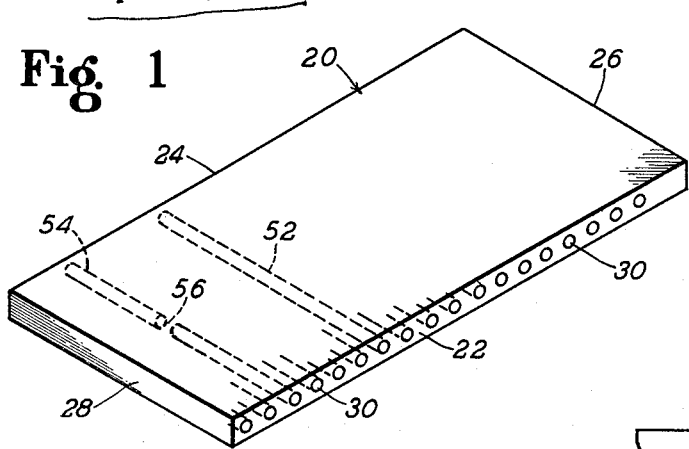
Fig. 1
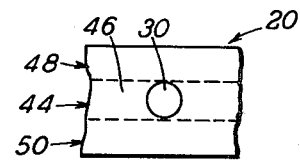
Fig. 2
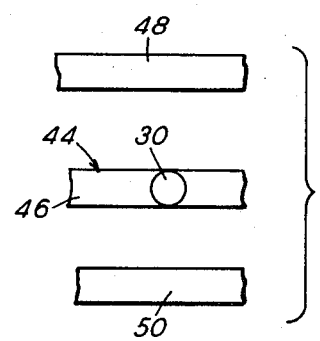
Fig. 3
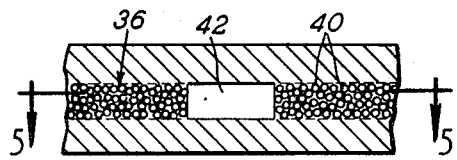
Fig. 4
Fig. 6
Fig. 5
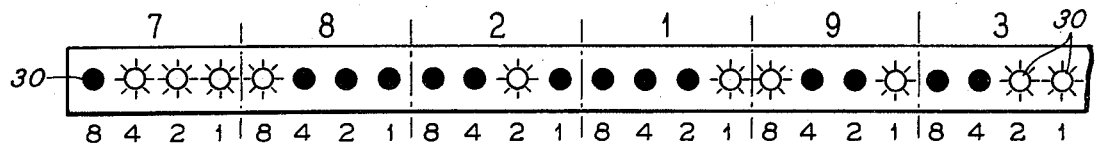
Fig. 7
INVENTORS
Arthur V. Appel
John S. Davis
Donald A. Pontarelli
BY Davis, Lucas, Brewer & Brugman
ATTORNEYS

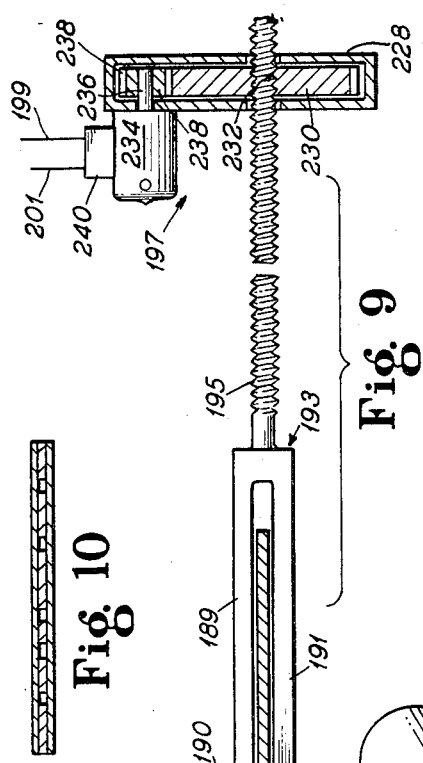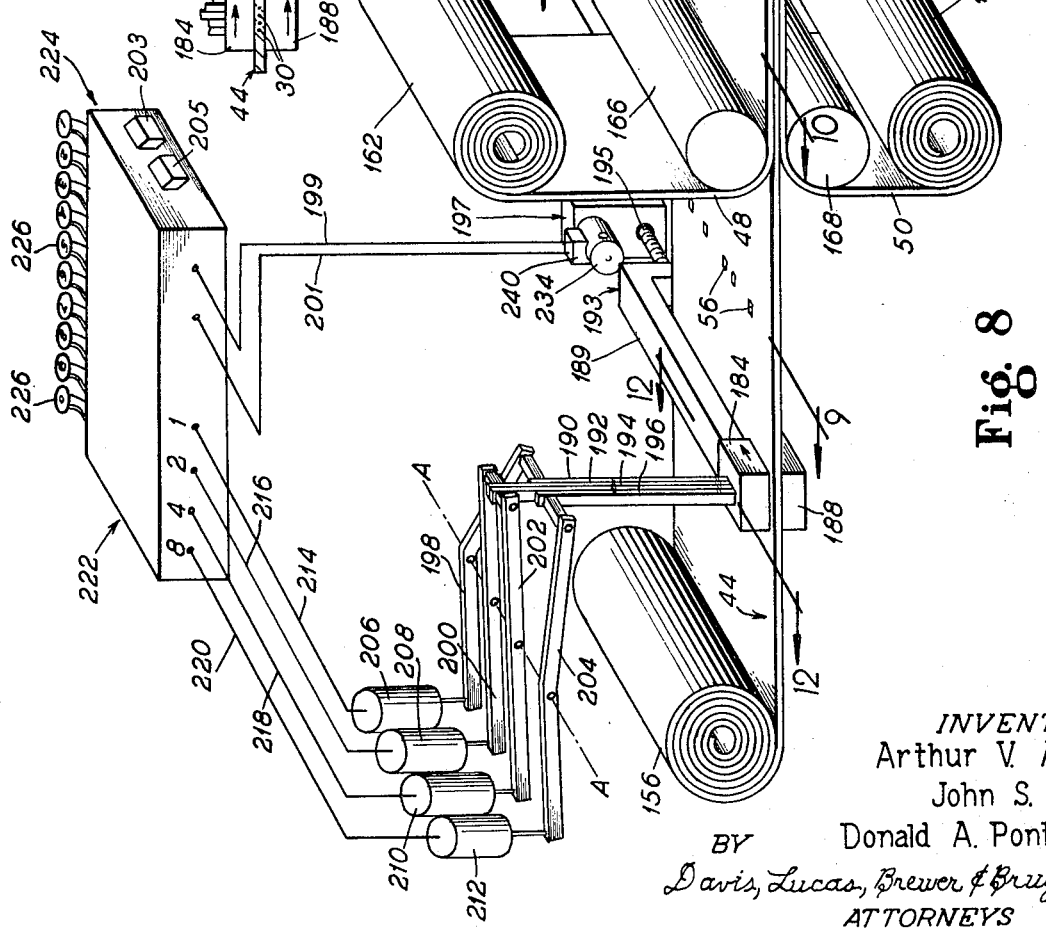

United States Patent Office 3,694,285
Patented Sept. 26, 1972

3,694,285
METHOD FOR MAKING ENCODED CARDS
Arthur V. Appel, Chicago, John S. Davis, Evanston, and Donald A. Pontarelli, Chicago, Ill., assignors to Bliss & Laughlin Industries, Incorporated, Oak Brook, Ill.
Filed Sept. 29, 1970, Ser. No. 76,537
Int. Cl. B32b 7/00
U.S. Cl. 156—179                             8 Claims

ABSTRACT OF THE DISCLOSURE

An elongated core strip having a layer of parallel, light-transmitting fibers, is continuously uncoiled and advanced along a line of movement parallel to the fibers. The core strip is periodically encoded at intervals along its length by cutting, punching, darkening, or otherwise impairing the light-transmitting ability of fibers in selected portions of the layer across the width of the core strip. The remaining unimpaired light transmitting fibers are irregularly-spaced in an information-related array extending across the width of the core strip. A pair of protective cover strips are continuously uncoiled and bonded integrally with opposite sides of the core strip. The resulting three part laminate continues to advance along the line of movement as a continuation of the core strip and is periodically sheared at intervals along a line between the encoded portions to provide individual cards. The fore and aft edges of the cards are ground, if necessary, to expose the ends of at least the unimpaired light-transmitting fibers.

CROSS-REFERENCE TO RELATED APPLICATION

Reference is made to the following related patent application, assigned to the same assignee: Borough and Pontarelli, Ser. No. 76,523 filed Sept. 29, 1970, on Encoded Card.

BACKGROUND OF THE INVENTION

Encoded cards, such as conventional credit cards, identification cards, parking lot passes, and railway commuter tickets, are made to store information in embossments, engravings, magnetic and invisible inks, punched holes, and notches. Such cards have limited life; the information can be removed in whole or part from them by carelessness or intent; and all such cards have been successfully counterfeited.

There is a need for a method of making encoded cards which can be decoded without physical contact, such as mechanical feelers and electrical styli, which are not easily changed or multilated by friction or abrasion, and which are very difficult to counterfeit.

BRIEF SUMMARY OF THE INVENTION

The general object of this invention is to provide a method for making an encoded card capable of transmitting electromagnetic radiation energy such as heat or electricity, or such as visible, infrared or ultraviolet light, from one edge to another where it appears in a discrete, information-related linear pattern of energized and non-energized areas or lighted and unlighted areas which can be decoded into numbers, letters or other information.

A specific object of this invention is to provide a method for making an encoded card, such as a credit or identification card, having a series of light-transmitting fibers extending from one edge to another and arranged to store information which can be read by transmitting light edgewise through the card and decoding the resulting pattern of lighted and unlighted edge portions.

Another object is to provide a method for making a fiber optics card having a plurality of light-transmitting fibers extending from one edge to another and encoding the card by cutting, punching, darkening, or otherwise impairing or physically disrupting the light-transmitting ability of selected fibers in such a manner that the remaining unimpaired fibers are capable of conducting light from one edge of the card to another in an intelligent pattern capable of being decoded into numbers, letters, or other information.

Another object is to provide a method of making an encoded fiber optics card which can be decoded without contact, which is highly resistant to mutilation or change, and which is very difficult to counterfeit.

Other objects and advantages will be apparent from the following description in connection with the drawings in which:

FIG. 1 is a perspective view of an encoded fiber optics card illustrating a preferred form of the invention;

FIG. 2 is a fragmentary edge view of FIG. 1, in which an individual light-transmitting fiber is shown as a monofilament, light rod, or light pipe;

FIG. 3 is an exploded view of FIG. 2, before lamination;

FIG. 4 is a fragmentary cross-section of a laminated fiber optics card having a light-transmitting fiber core strip or sheet between strips or sheets of nontransmitting material encoded by punching out a section of the fiber core material;

FIG. 5 is a cross-section of FIG. 4, taken along the line 5—5 showing in plan view the punched-out portion of the fiber core material;

FIG. 6 is a fragmentary edge view of the card, taken along the line 6—6 of FIG. 5;

FIG. 7 is a fragmentary edge view of an encoded card with light-transmitting fibers arranged in groups displaying binary numbered information;

FIG. 8 is a perspective schematic view of apparatus for continuously manufacturing encoded fiber optics cards in accordance with the method of the present invention;

Figure 11:
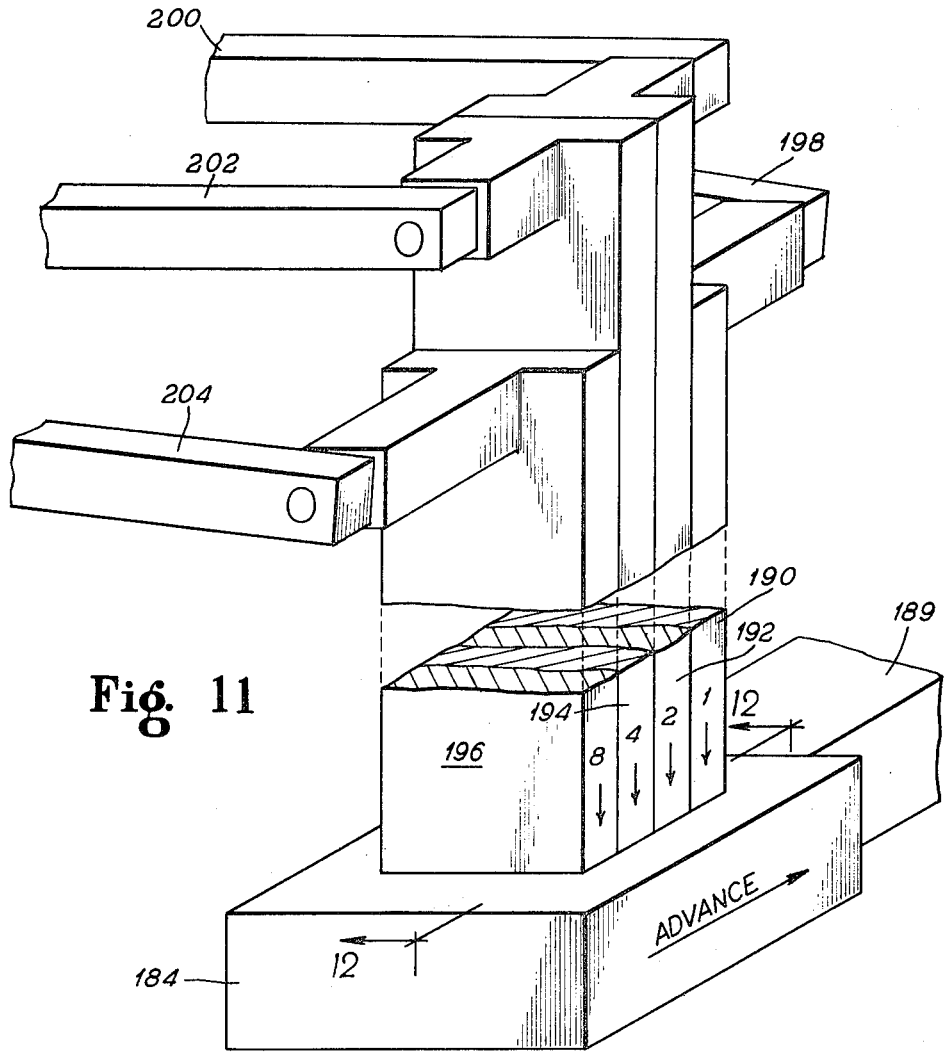
Figure 12:
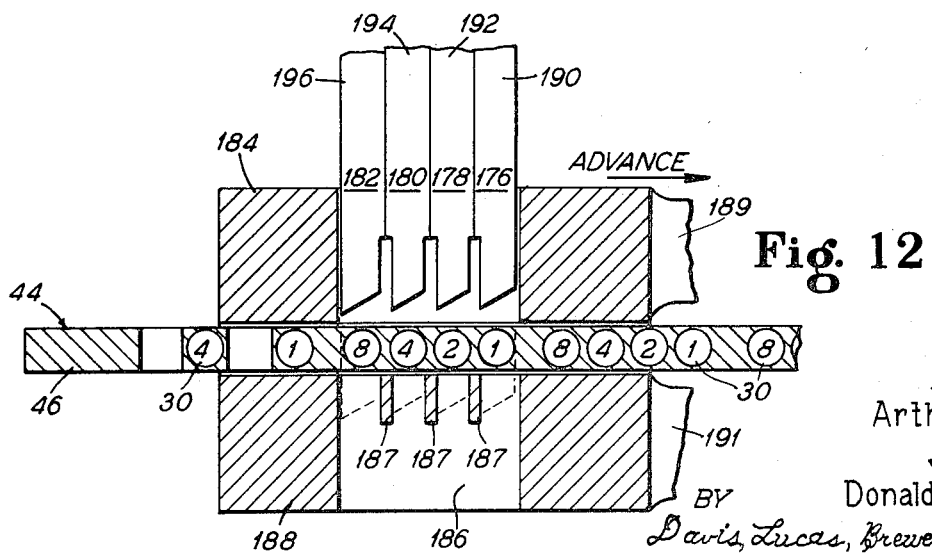

FIGS. 9 and 10 are cross-sectional views of FIG. 8 taken respectively along lines 9—9 and 10—10;

FIG. 11 is a fragmentary enlarged perspective view of FIG. 8, showing punching dies for selectively cutting fibers to store or record digits in binary form; and FIG. 12 is a fragmentary, cross-sectional view of FIGS. 8 and 11 taken along line 12—12.

Like parts are referred to by like reference characters throughout the figures.

Referring to the drawings, FIGS. 1 through 7 show examples of encoded cards made in accordance with the present invention. These cards and apparatus for decoding them are shown and described in the related application referred to above, so that description will not be repeated here in detail.

Briefly, the card shown in FIG. 1 is a flat sheet comprising a body 20 having long edges 22, 24 and short edges 26, 28. The body has a plurality of parallel, light-transmitting fibers 30. The body is preferably of plastics material having a substantially lower light-transmitting ability than the fibers 30. It may even be opaque or colored to contrast with the fibers. Each fiber 30 is of optical material and may be a monofilament element, such as a single glass or plastic filament, light rod or light pipe, as shown in FIG. 2. Or each fiber 30 may be a bundle of smaller cross-section multifilament optical elements (not shown).

Although each fiber 30 is shown as made of light-transmitting optical material, the principles of the present invention will be equally applicable to energy-transmitting fibers of any kind, such as metal wires.

Details of construction of card 20 are shown in FIGS. 2 and 3. This is a three-part or three-layer laminate comprising a core strip or sheet 44 and cover strips or sheets 48, 50, bonded together into one integral card body by the method of the present invention.

The core strip 44 comprises a relatively non-light-transmitting matrix 46 containing the light-transmitting fibers 30.

The light-transmitting fibers 30 may be optical glass, or polymerized methyl methacrylate, sold under the trademark "Lucite," in either case being cladded with an appropriately low refractive index coating to maximize light-transmission from end to end, as is conventional in this art.

Similarly, where the fiber 30 is a bundle of multifilaments (not shown), each filament will comprise a light-transmitting core with appropriate cladding to maximize light-transmission and to minimize "crosstalk" between adjacent filaments.

In the embodiment of FIGS. 4, 5 and 6, a continuous sheet, or strip, 36 of small-diameter, light-transmitting filaments 40 may be used with portions having their light-transmitting ability impaired in selected areas, as by punching out the fibers in areas such as 42, to impair the transmission of light from one edge of the card to the other. This produces a light and dark pattern as shown in FIG. 6, when the card of FIG. 4 is backlighted. The "light-transmitting fibers" are the continuous (uncut) bundles of small filaments 40 flanking the filaments punched out in the areas 42.

Cards made according to this invention may have various shapes and sizes. A convenient carrying size is about 3¼" x 2⅜" and 0.030" to 0.050" thick. The thickness has been exaggerated in the accompanying drawings.

Light-transmitting fibers may have a wide variety of sizes and shapes. Fibers varying from 0.003" to 0.010" in diameter provide a practical compromise between the maximum number of fibers per inch and the maximum light-transmission per fiber. For fuller explanation of the manner in which light is transmitted by optical fibers from point to point, refer to "Fiber Optics, Principles and Application" by N. S. Kapany, 1967 Edition, published by Academic Press, New York City, N.Y.

One way of storing information is shown in FIG. 7 where the fibers 30 are arranged in groups of four, each group being coded to designate a digit in the binary numbering system. Coding is done by impairing (or cutting, etc.) the light-transmission through selected fibers in each group of four.

Referring to FIG. 7, the individual fibers in each group of fibers 30 are respectively assigned values of "8," "4," "2" and "1," according to the binary code. Individual fibers are impaired, or cut, or otherwise darkened, as shown by the darkened circles, to display the number "782193" in the six groups of fibers on the portion of the card edge shown in FIG. 7.

Each fiber 30, and fiber 40 which is uncut, extends continuously between card edges (except where rendered discontinuous by coding). The card is encoded, by individually cutting, darkening, partially removing, or otherwise impairing the light-transmitting ability of selected fibers. For instance, in FIG. 1, 52 indicates a fiber which is continuous and therefore capable of transmitting light from one edge of the card to the other, whereas 54 is a fiber which is discontinuous where it has been punched out in the area 56 and therefore is incapable of transmitting full intensity light. This area 56 as well as area 42 in FIG. 4, may be filled with opaque material, if desired to completely block light-transmission, for maximum contrast, when light is transmitted edgewise through the card.

One apparatus for carrying out the present method in continuously manufacturing encoded cards is shown schematically in FIGS. 8 through 12.

This method is described for making cards having the transversely spaced, individual fibers 30 as shown in FIGS. 1, 2, 3 and 7. It will be obvious that the method is equally applicable to a card as shown in FIGS. 4, 5 and 6 where the central core sheet comprises a layer of multifilament light-transmitting elements 40 suitably impaired by cut-out portions 42.

The method of the present invention will now be described in producing a binary coded card as shown in FIG. 7.

A fiber optics core strip or sheet 44 is uncoiled from a roll 156, and is advanced along a line of movement (to the right in FIG. 8) to a location where it is fed between upper and lower cover strips or sheets 48 and 50, which are uncoiled and advanced from rolls 162 and 164. The three strips are pressed into a unitary, bonded, three-layer laminated strip by pressure means comprising pinch rolls 166 and 168. These may be heated (by means not shown), and adhesive may be applied between the strips, if needed, to bond the three layers into an integral body and cover and fill in the coding openings 56 punched in the sheet 44.

As the bonded, three-part laminate 45 is advanced to the output end at the right in FIG. 8, it is automatically sheared to the desired width between shear blades 170 and 172. The finished cards collect in a stack as indicated at 174 and may, if desired, then have their edges ground and polished to expose the ends of at least the uncut light-transmitting fibers 30.

The binary coding to produce cards as shown in FIG. 7 is carried out by apparatus including dies 176, 178, 180 and 182 (FIG. 12).

The dies are slidable up and down in a guide block 184 and are effective to impair the light-transmitting ability of a selected one, or ones, of the fibers 30, by cutting or punching out an intermediate portion of it. The dies cut through the fiber optics sheet 44 and discharge their cuttings into a cavity 186 in the lower die block 188. A series of spaced grids 187 support the underside of the core sheet during the encoding operation. Thus, any one or any combination of the dies 176, 178, 180 and 182 can be operated without adversely affecting an adjacent uncut fiber.

The guide block 184 and the lower die block 188 are respectively connected to parts 189 and 191 of a bifurcated member 193. The latter has an extension screw 195 which is threadedly engaged within and reciprocable back and forth through an electrically actuated indexing means 197.

The indexing means 197 is best shown in FIGS. 8 and 9. It comprises a housing 228 supporting a gear 230 which has a tapped center bore 232 threadedly engaged with the screw 195. A motor 234 is mounted on the housing and has a drive shaft 236, and a pinion 238 meshed with gear 230. Rotation of the latter moves the screw 195, and member 193, longitudinally of the screw. The motor 234 may be energized, through lines 199, 201, concurrently with energization of a suitable counter control 240. The control 240 enables the motor to turn the precise number of revolutions required to move the indexing member 193, and parts movable with it, from one operative position where the dies 176, 178, 180 and 182 are aligned with one set of four fibers 30, to a position where they are aligned with the next adjacent set of fibers.

As shown in FIG. 12, dies 176, 178, 180 and 182 are aligned respectively with four fibers 30 in one group and are in position selectively to cut any one or any combination of the four fibers.

The dies are carried at the lower ends of vertical plungers 190, 192, 194 and 196. These are pivoted to the ends of levers 198, 200, 202 and 204, all of which are fulcrumed about a rod (not shown) on a common axis A—A (FIG. 8). Magnetic or solenoid-type actuators 206, 208, 210 and 212 are connected to the operating ends of the levers. When actuated, they pull upward to drive the remote ends of the levers and the plungers downward to punch the corresponding cutting dies through the core strip 44.

The actuators 206, 208, 210, 212 and levers 198, 200, 202, 204 and plungers 190, 192, 194 and 196 are all connected (by means not shown) to the bifurcated member 193 and are movable by screw 195, with the blocks 184, 188, back and forth across the width of core strip 44.

The actuators 206, 208, 210 and 212 are controlled respectively through lines 214, 216, 218 and 220, from an analog to digital converter 222. This has an input keyboard 224 with individual keys 226 numbered from "1" to "9" plus "0." The converter 222 also has a START button 203 and a RESET button 205. Details of the converter 222 are not part of the present invention, so will not be specifically described.

Output terminals on the converter 222 are labeled "8," "4," "2" and "1" respectively, corresponding to the binary code.

In operation, pressing the RESET button 205 will actuate the indexing means 197 to reverse the motor 234 and move the guide and die blocks 184, 188 and actuators 206 etc. to the extreme left-wise position in FIG. 9. In this position, the four dies are registered with the left-hand group of four fibers 30.

As an example, one of the 4-fiber groups in the core strip 44 may be binary coded to a "5" by pressing the "5" button 226. By operation of circuitry (not shown) in the converter 222, depressing the "5" button places signals on converter terminals "8" and "2." These signals passing into lines 220 and 216, energize actuators 212 and 208, driving punching dies 182 and 178 downward through the core sheet 44. This punches out a section of each of the "8" and "2" fibers leaving only the "4" and "1" fibers unimpaired. Light transmitted edgewise through the card will illuminate the "4" and "1" fibers, leaving the others dark, thereby providing a pattern which can be decoded as the numeral "5" in an appropriate reader.

Subsequent operation of another one of the keys 226 will automatically actuate the index means 197 to move the parts connected with blocks 184, 188 one position to the right, into alignment with the next group of four fibers 30, and then punch out selected fibers 30.

It is emphasized that the fibers 30 may have their light-transmitting ability selectively impaired in any desired way. Cutting or physically disrupting the fibers by means of the punches shown is merely illustrative and not limiting. Other means may include pinching the fibers to reduce their effective cross-section, or reducing or darkening them by heat or radiation.

It will also be apparent that the techniques of encoding the core strip 44, which has separate and transversely spaced fibers 30, may be applied effectively to the sheet 36 shown in FIG. 4 which has a continuous layer of miniature light transmitting filaments 40.

It should be understood that although a particular method of practicing the present invention has been disclosed, this invention includes all modifications and equivalents which fall within the scope of the appended claims.

We claim as our invention:

1. In a method for making encoded cards the steps of:
   arranging a layer of a plurality of elongated light-transmitting fibers in a tranversewise irregularly spaced, substantially planar array forming a core strip with the spacing between the fibers providing information in accordance with a predetermined code;
   bonding a cover strip to each side of the core strip to form an integral, three-part laminate; and
   trimming the laminate to form a card with edges in which the ends of said light-transmitting fibers are arranged in a linear information-related pattern at both edges of the card capable of transmitting light energy edgewise through the card.

2. In a method for making encoded cards, the steps of:
   arranging a layer of elongated light-transmitting fibers side-by-side to form a core strip;
   impairing the light-transmitting ability of said fibers in selected areas of said core strip while leaving the remaining fibers unimpaired;
   bonding a cover strip to each side of the core strip to form an integral, three-part laminate; and
   trimming the laminate tranversely to form a card with a core having at least one said selected area between its ends and in which the ends of said remaining, unimpaired light-transmitting fibers are arranged in a linear pattern capable of transmitting light energy edgewise through the cards but which are relatively spaced to provide information in accordance with a predetermined code.

3. In a method for making encoded cards, the steps of claim 2 in which the light-transmitting ability of the fibers is impaired by physically disrupting them.

4. In a method for making encoded cards, the steps of:
   advancing, along a line of movement an elongated core strip having a layer of parallel, light-transmitting fibers which are elongated along said line of movement;
   encoding said core strip at intervals along the length of the core strip by impairing the light-transmitting ability of fibers in selected portion of said layer across the width of the core strip while leaving the remaining, unimpaired, light-transmitting fibers in an irregularly-spaced, substantially planar array across the width of the core strip with the spacing being in accordance with a predetermined code;
   advancing a pair of cover strips toward opposite sides of said core strip and bonding them into an integral, three-part laminate and advancing the laminate along said line of movement as a continuation of said core strip;
   periodically shearing said laminate across the width thereof along a line between the encoding intervals to produce individual cards; and
   treating the fore and aft edges of the cards to expose the ends of at least said unimpaired light-transmitting fibers.

5. A method for making encoded cards comprising the steps of:
   continuously uncoiling a core strip having a layer of parallel, light-transmitting fibers extending lengthwise thereof, and advancing said core strip along a line of movement parallel to said fibers;
   encoding said core strip at intervals along the length of the core strip by physically disrupting fibers in selected portions of said layer across the width of the core strip while leaving the remaining light-transmitting fibers intact in an irregularly-spaced, substantially planar array across the width of the core strip with the spacing being in accordance with a predetermined code;
   continuously uncoiling a pair of cover strips and advancing them toward opposite sides of said core strip and bonding them into an integral, three-part laminate and advancing the laminate along said line of movement as a continuation of said core strip; and
   periodically shearing said laminate across the width thereof along a line between the encoding intervals to produce individual cards.

6. A method for making encoded cards according to claim 5 including the additional step of grinding the fore and aft edges of the cards to expose the ends of at least said intact light-transmitting fibers.

7. A method for making encoded cards according to claim 5 wherein the fibers are physically disrupted by punching out said selected portions of said layer to leave voids therein, and subsequently covering said voids and rendering them invisible by said cover strips.

8. A method for making encoded cards comprising the steps of:
   advancing, along a line of movement, an elongated core strip having a layer of individual, transversely-spaced, parallel, light-transmitting fibers which are elongated along said line of movement;

encoding said core strip at intervals along the length of the core strip by impairing the light-transmitting ability of selected individual fibers in said layer while leaving the remaining unimpaired light-transmitting fibers in an irregularly-spaced, substantially planar array across the width of said core strip with the spacing being in accordance with a predetermined code;

advancing a pair of cover strips toward opposite sides of said core strip and bonding said strips into an integral three-part laminate and advancing the laminate along said line of movement as a continuation of said core strip;

periodically shearing said laminate across the width thereof along a line between the encoding intervals to produce individual cards; and grinding the fore and aft edges of the cards to expose the ends of at least said unimpaired light-transmitting fibers.

References Cited

UNITED STATES PATENTS

| | | | |
|---|---|---|---|
| 2,943,968 | 7/1960 | Freeman et al. | 350—96 B X |
| 3,227,535 | 1/1966 | Woodcock | 350—96 B X |
| 2,992,956 | 7/1961 | Bazinet | 350—96 B X |
| 2,979,431 | 4/1961 | Perrault | 350—96 B X |

RALPH S. KENDALL, Primary Examiner

C. WESTON, Assistant Examiner

U.S. Cl. X.R.

40—2.2; 156—166; 283—6; 350—96 B